US012633526B2

(12) United States Patent
Kimura

(10) Patent No.: US 12,633,526 B2
(45) Date of Patent: May 19, 2026

(54) ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventor: Fumiko Kimura, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 527 days.

(21) Appl. No.: 18/183,853

(22) Filed: Mar. 14, 2023

(65) Prior Publication Data

US 2023/0299273 A1 Sep. 21, 2023

(30) Foreign Application Priority Data

Mar. 17, 2022 (KR) ........................ 10-2022-0033559

(51) Int. Cl.

*H01M 4/36* (2006.01)
*H01M 4/133* (2010.01)
*H01M 4/38* (2006.01)
*H01M 4/48* (2010.01)
*H01M 4/587* (2010.01)
*H01M 4/02* (2006.01)

(52) U.S. Cl.

CPC ........... *H01M 4/366* (2013.01); *H01M 4/133* (2013.01); *H01M 4/386* (2013.01); *H01M 4/48* (2013.01); *H01M 4/587* (2013.01); *H01M 2004/027* (2013.01)

(58) Field of Classification Search

None
See application file for complete search history.

(56) References Cited

U.S. PATENT DOCUMENTS

2014/0147743 A1* 5/2014 Stalder .................. H01M 4/043 429/218.1
2019/0296394 A1 9/2019 Iwasaki et al.
2020/0388848 A1 12/2020 Lee
(Continued)

FOREIGN PATENT DOCUMENTS

JP 2008-159333 A 7/2008
JP 2019-169291 A 10/2019
(Continued)

OTHER PUBLICATIONS

Office Action, corresponding to Korean Application No. 10-2022-0033559, dated Dec. 19, 2025, 7 pages.

*Primary Examiner* — Zhongqing Wei
(74) *Attorney, Agent, or Firm* — Womble Bond Dickinson (US) LLP

(57) ABSTRACT

An electrode for a rechargeable lithium battery and a rechargeable lithium battery including the same, wherein the electrode for the rechargeable lithium battery includes a current collector, a first active material layer positioned on the current collector, and including a first active material and a first binder; and a second active material layer positioned on the first active material layer, and including a second active material and a second binder, and wherein an amount of the first binder included in the first active material layer is higher than an amount of the second binder included in the second active material layer, and the second active material layer includes a fibrous ceramic material.

8 Claims, 1 Drawing Sheet

(56) References Cited

U.S. PATENT DOCUMENTS

| | | | | |
|---|---|---|---|---|
| 2021/0091370 | A1 | 3/2021 | Yamada et al. | |
| 2021/0119200 | A1* | 4/2021 | Nam ..................... | H01M 4/131 |

FOREIGN PATENT DOCUMENTS

| | | | |
|---|---|---|---|
| JP | 2021-051987 | A | 4/2021 |
| KR | 1020140070446 | A | 6/2014 |
| KR | 10-2019-0029320 | A | 3/2019 |
| KR | 10-2019-0064480 | A | 6/2019 |
| KR | 10-2020-0141318 | A | 12/2020 |

* cited by examiner

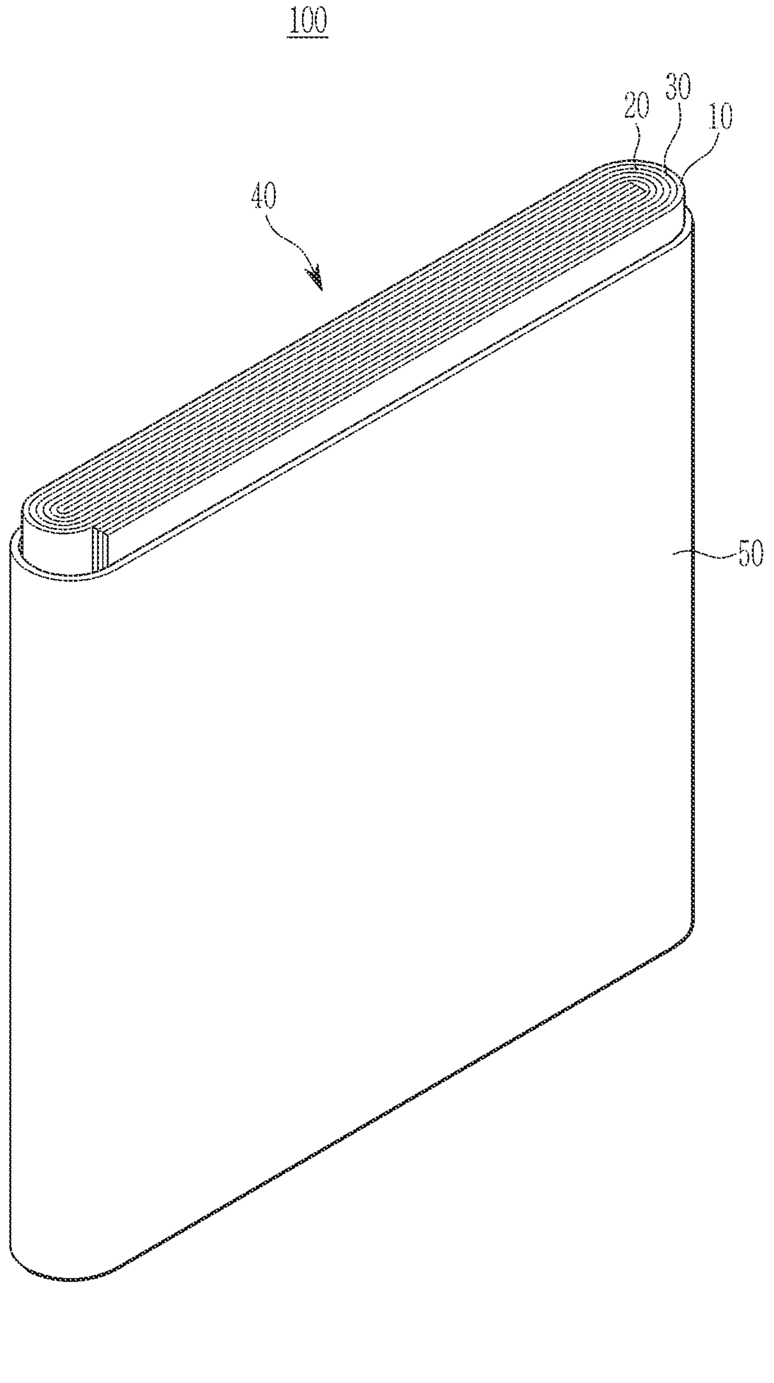
100
40
20
30
10
50

ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2022-0033559, filed in the Korean Intellectual Property Office on Mar. 17, 2022, the entire content of which is incorporated herein by reference.

BACKGROUND

1. Field

Embodiments of the present disclosure described herein are related to an electrode for a rechargeable lithium battery and a rechargeable lithium battery including the same.

2. Description of the Related Art

A rechargeable lithium battery has recently drawn attention as a power source for small portable electronic devices, and the rechargeable lithium battery uses an organic electrolyte solution and thereby has a discharge voltage that is at least twice of that of a battery utilizing an alkali aqueous solution, and accordingly, has high energy density.

As for positive active materials of a rechargeable lithium battery, oxides including lithium and a transition metal with a structure capable of intercalating/deintercalating lithium ions, such as $LiCoO_2$, $LiMn_2O_4$, $LiMn_2O_4$, $LiNi_{1-x}Co_xO_2$ ($0<x<1$), and/or the like have been mainly utilized.

As for negative active materials, one or more suitable carbon-based materials capable of intercalating/deintercalating lithium ions such as artificial graphite, natural graphite, hard carbon, and/or the like have been utilized, and recently, a non-carbon-based negative active material such as silicon or tin has been researched in order to obtain high capacity.

The above information disclosed in this Background section is only for enhancement of understanding of the background of the present disclosure, and therefore it may contain information that does not form the prior art that is already suitable in this country to a person of ordinary skill in the art.

SUMMARY

An aspect of one or more embodiments is directed toward an electrode for a rechargeable lithium battery exhibiting excellent or suitable fast charge capacity.

An aspect of one or more embodiments is directed toward a rechargeable lithium battery includes the electrode.

Additional aspects will be set forth in part in the description which follows and, in part, will be apparent from the description, or may be learned by practice of the presented embodiments of the disclosure.

According to one or more embodiments, an electrode for a rechargeable lithium battery includes a current collector; a first active material layer positioned on the current collector, and including a first active material and a first binder; and a second active material layer positioned on the first active material layer, and including a second active material and a second binder, wherein an amount of the first binder included in the first active material layer is higher than an amount of the second binder included in the second active material layer, and the second active material layer includes a fibrous ceramic material.

According to one or more embodiments, the fibrous ceramic material may include cellulose, cellulose, alumina ($Al_2O_3$), silica ($SiO_2$), titania ($TiO_2$), magnesia ($MgO$), $ZrO_2$, $Zr_2O_3$, or a combination thereof. The fibrous ceramic material may have an average diameter of about 1 nm to about 1000 nm. An amount of the fibrous ceramic material may be about 0.2 wt % to about 4.0 wt % based on the total of 100 wt % of the second active material layer. A weight ratio of the first binder and the second binder may be about 51:49 to about 80:20. The first active material and the second active material may include a silicon-based negative active material, a carbon-based negative active material, or a combination thereof According to one or more embodiments, a rechargeable lithium battery includes the electrode and a non-aqueous electrolyte. The electrode may be a negative electrode.

One or more embodiments are included in the following detailed description.

An electrode for a rechargeable lithium battery according to one or more embodiments may provide a rechargeable lithium battery exhibiting excellent or suitable fast charge capacity.

BRIEF DESCRIPTION OF THE DRAWINGS

The drawing is a schematic view showing a structure of the anode according to one embodiment of the present disclosure.

DETAILED DESCRIPTION

Hereinafter, embodiments of the present disclosure are described in more detail to embodiments, examples of which are illustrated in the accompanying drawings, wherein like reference numerals refer to like elements throughout, and duplicative descriptions thereof may not be provided. However, these embodiments are examples, the present disclosure is not limited thereto, and the present disclosure is defined by the scope of claims.

The terminology utilized herein is utilized to describe embodiments only, and is not intended to limit the present disclosure. The singular expression includes the plural expression unless the context clearly dictates otherwise.

As utilized herein, "combination thereof" refers to a mixture, laminate, composite, copolymer, alloy, blend, reaction product, and/or the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout, and duplicative descriptions thereof may not be provided the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In some embodiments, "layer" herein includes not only a shape formed on the whole surface when viewed from a plan view, but also a shape formed on a partial surface.

Herein, "or" is not to be construed as an exclusive meaning, for example, "A or B" is construed to include A, B, A+B, and/or the like.

An electrode for a rechargeable lithium battery includes a current collector, a first active material layer positioned on the current collector, and including a first active material and a first binder; and a second active material layer positioned on the first active material layer, and including a second active material and a second binder. The first active material layer may be positioned on one side or on both (e.g., opposite) sides of the current collector. As the second active material layer is positioned on the first active material layer, when the first active material layer is positioned on both (e.g., opposite) sides of the current collector, the second active material layers are also positioned on both (e.g., opposite) sides of the current collector in the electrode.

In one embodiment, an amount of the first binder included in the first active material layer may be about 1 wt % to about 5 wt % based on the total, 100 wt % of the first active material layer.

When the first binder is within the range, the first active material layer may have better adherence to the current collector, thereby effectively preventing or reducing deformation due to the expansion of the electrode assembly (a battery element in which a positive electrode, a separator and a negative electrode are wound or stacked), as repeated charging and discharging occurs.

An amount of the second binder included in the second active material layer may be about 0.1 wt % to 3 wt % based on the total, 100 wt %, of the second active material layer.

When an amount of the second binder within the range, it is possible to secure fast chargeability.

According to one embodiment, the amount of the first binder included in the first active material layer is higher than that of the second binder included in the second active material layer.

As such, the higher amount of the first binder than that of the second binder may improve the adhesion strength between the current collector and the first active material layer, and resultantly, the cycle-life characteristic and overvoltage characteristics may be improved.

When the amount of the first binder included in the first active material layer is identical to that of the second binder included in the second active material layer, the adhesion strength between the current collector and the first active material layer may be reduced. When it is illustrated in more detail, the binder may be moved to a surface of the electrode, together with the solvent, in evaporation of the solvent included in the slurry during the active material layer preparation, and thus, migration may occur, thereby reducing adhesion between the current collector and the first active material layer. Furthermore, when the second binder is included in a larger amount than the first binder, an overvoltage may be spread in the active material layer due to clogging of the surface pores of the active material layer and a decrease in the ionic conductive, thereby deteriorating rapid charge performance.

In one embodiment, a weight ratio of the first binder and the second binder may be about 80:20 to about 51:49 by weight ratio, or about 80:20 to about 57:43 by weight ratio. Herein, the weight ratio of the first binder and the second binder refers to a weight ratio of the amount of the first binder included in the first active material to an amount of the second binder included in the second active material layer. When the weight ratio of the first binder and the second binder is satisfied in the range, suitable adherence to the current collector and between the active materials and excellent or suitable high-rate cycle-life characteristics may be exhibited.

In one embodiment, the amount of the second binder may be about 20 wt % to about 49 wt % based on the total binder of the active material layer, i.e., a sum of 100 wt % of the amount of the binder of the first active material layer and the amount of the binder of the second active material layer.

The first binder and the second binder may be an aqueous binder, a non-aqueous binder, or a combination thereof. The first binder and the second binder may be the same as or different from each other.

The aqueous binder may be a styrene-butadiene rubber, an acrylated styrene-butadiene rubber, an acrylonitrile-butadiene rubber, an acryl rubber, a butyl rubber, a fluorine rubber, an ethylene oxide-containing polymer, polyvinylpyrrolidone, polyepichlorohydrin, polyphosphazene, ethylene propylene diene copolymer, polyvinylpyridine, chlorosulfonated polyethylene, latex, a polyester resin, an acryl resin, a phenol resin, an epoxy resin, polyvinyl alcohol, or a combination thereof.

The non-aqueous binder may be ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

When the first binder and the second binder utilize the aqueous binder, a cellulose-based compound may be further utilized to provide viscosity as a thickener. The cellulose-based compound includes one or more of carboxymethyl cellulose, hydroxypropyl methyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

In one embodiment, the second active material layer may include a fibrous ceramic material. When the second active material layer includes the fibrous ceramic material, the capillary effect and the ionic conduction effect owing to the surface charge may improve lithium ionic conductivity of the negative electrode. Resultantly, the fast charge capacity, i.e., fast charge characteristics, may be improved. When the fibrous ceramic material is included in the first active material layer, or is also included in the first active material layer (included in the first and second active material layers), adhesion between the first active material layer and the current collector may be deteriorated.

In some embodiments, the ceramic material in a form of particle-shaped, rather than the fibrous, may not impart the capillary effects, thereby severely lowering the decreases in the ion resistance.

Furthermore, even when it is fibrous, when a carbon-based material, other than the ceramic material, for example, a carbon nanotube, is utilized, ionic conductivity owing to the surface charge may not be obtained, thereby severely lowering the decreases in the ion resistance.

The fibrous ceramic material may be cellulose, alumina ($Al_2O_3$), silica ($SiO_2$), titania ($TiO_2$), magnesia ($MgO$), $ZrO_2$, $Zr_2O_3$, or a combination thereof. $Zr_2O_3$ may be, for example, tetragonal partially stabilized zirconia (PSZ). In one embodiment, the fibrous ceramic material may be alumina ($Al_2O_3$).

The fibrous ceramic material may have an average diameter of about 1 nm to about 1000 nm. The fibrous ceramic material may have an average length of about 0.1 μm to about 10 μm. When the fibrous ceramic material has the average diameter and the average length within the ranges, more excellent or suitable adherence may be provided and the high-rate cycle-life characteristics may be improved.

In one embodiment, an amount of the fibrous ceramic material may be about 0.2 wt % to about 4.0 wt % based on the total of 100 wt % of the second active material layer.

The electrode may be at least one of a positive electrode or a negative electrode, and according to one embodiment, may be the negative electrode.

When the electrode is the negative electrode, the first active material and the second active material may be a silicon-based negative active material, a carbon-based negative active material, or a combination thereof. In some embodiments, the first active material and the second active material may be the same as or different from each other.

The silicon-based active material may be Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si—C composite, or a combination thereof.

The Si—C composite may include silicon and crystalline carbon. Herein, the silicon particle may have an average particle diameter D50 of about 10 nm to about 10 μm. The Si—C composite may further include an amorphous carbon layer formed on at least a portion thereof. In the specification, when a definition is not otherwise provided, such a particle diameter (D50) indicates an average particle diameter (D50), where a cumulative volume is about 50 volume % in a particle distribution.

The carbon-based active material may be crystalline carbon, amorphous carbon, or a combination thereof. The example of the crystalline carbon may be graphite such as unspecified shaped, plate-shaped, flake-shaped, spherical-shaped, or fibrous natural graphite or artificial graphite, and the amorphous carbon may be soft carbon, hard carbon, mesophase pitch carbide, sintered cokes, and/or the like.

The first active material layer and the second active material layer may further include a conductive material. The conductive materials in the first active material layer and the second active material layer may be the same as or different from each other.

In the first active material layer, an amount of the conductive material may be about 1 wt % to about 3 wt % based on the total 100 wt % of the first active material layer, and an amount of the conductive material may be about 1 wt % to about 3 wt % based on the total 100 wt % of the second active material layer. The conductive material is included to provide electrode conductivity. Any electrically conductive material may be utilized as a conductive material unless it causes a chemical change. Examples of the conductive material may include a carbon-based material such as natural graphite, artificial graphite, carbon black, acetylene black, ketjen black, a carbon fiber and/or the like; a metal-based material of a metal powder or a metal fiber including copper, nickel, aluminum, silver, and/or the like; a conductive polymer such as a polyphenylene derivative; and/or a mixture thereof.

The current collector may include one selected from a copper foil, a nickel foil, a stainless steel foil, a titanium foil, a nickel foam, a copper foam, a polymer substrate coated with a conductive metal, and a combination thereof.

When the electrode is the positive electrode, the first active material and the second active material may be the same or different, positive active material.

The positive active material may include lithiated intercalation compounds that reversibly intercalate and deintercalate lithium ions. For example, one or more composite oxides of a metal selected from cobalt, manganese, nickel, and a combination thereof, and lithium, may be utilized. More specifically, the compounds represented by one of the following chemical formulae may be utilized. $Li_aA_{1-b}XbD_2$ ($0.90≤a≤1.8$, $0≤b≤0.5$); $Li_aA_{1-b}X_bO_{2-c}D_c$ ($0.90≤a≤1.8$, $0.90≤a≤1.8$, $0≤b≤0.5$, $0≤c≤0.05$); $Li_aE_{1-b}X_bO_{2-c}D_c$ ($0≤b≤0.5$, $0≤c≤0.05$); $Li_aE_{2-b}X_bO_{4-c}D_c$ ($0≤b≤0.5$, $0≤c≤0.05$); $Li_aNi_{1-b-c}Co_bX_cD_a$ ($0.90≤a≤1.8$, $0≤b≤0.5$, $0≤c≤0.5$, $0<a≤2$); $Li_aNi_{1-b-c}Co_bX_cO_{2-a}T_a)$; ($0.90≤a≤1.8$, $0≤b≤0.5$, $0≤c≤0.5$, $0<a<2$); $Li_aNi_{1-b-c}Co_bX_cO_{2-a}T_2$ ($0.90≤a≤1.8$, $0≤b≤0.5$, $0≤c≤0.5$, $0<a<2$); $Li_aNi_{1-b-c}Mn_bX_cD_a$ ($0.90≤a≤1.8$, $0≤b≤0.5$, $0≤c≤0.5$, $0<a≤2$); $Li_aNi_{1-b-c}Mn_bX_cO_{2-a}T_a$ ($0.90≤a≤1.8$, $0≤b≤0.5$, $0≤c≤0.5$, $0<a<2$); $Li_aNi_{1-b-c}Mn_bX_cO_{2-a}T_2$ ($0.90≤a≤1.8$, $0≤b≤0.5$, $0≤c≤0.5$, $0<a<2$); $Li_aNi_bE_cG_dO_2$ ($0.90≤a≤1.8$, $0≤b≤0.9$, $0≤c≤0.5$, $0.001≤d≤0.1$); $Li_aNi_bCo_cMn_dG_eO_2$ ($0.90≤a≤1.8$, $0≤b≤0.9$, $0≤c≤0.5$, $0≤d≤0.5$, $0.001≤e≤0.1$); $Li_aNiG_bO_2$ ($0.90≤a≤1.8$, $0.001≤b≤0.1$) $Li_aCoG_bO_2$ ($0.90≤a≤1.8$, $0.001≤b≤0.1$); $Li_aMn_{1-b}G_bO_2$ ($0.90≤a≤1.8$, $0.001≤b≤0.1$); $Li_aMn_2G_bO_4$ ($0.90≤a≤1.8$, $0.001≤b≤0.1$); $Li_aMn_{1-g}G_gPO_4$ ($0.90≤a≤1.8$, $0≤g≤0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0≤f≤2$); $Li_{3-f}J_2(PO_4)_3$ ($0≤f≤2$); $Li_aFePO_4$ ($0.90≤a≤1.8$)

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by utilizing these elements in the compound. For example, the method may include any coating method such as spray coating, dipping, and/or the like, but is not illustrated in more detail because it is suitable in the related field.

In the positive electrode, an amount of the first active material may be about 90 wt % to about 98 wt % based on the total weight (at 100 wt %) of the first active material layer. In some embodiments, the amount of the second active material may be about 90 wt % to about 98 wt % based on the total weight of the second active material layer.

In an embodiment, the first and the second positive active material layers may further include a binder and a conductive material. Herein, the binder and the conductive material may be included in an amount of about 1 wt % to about 5 wt %, respectively based on the total amount of the first positive active material layer, or an amount of about 1 wt % to about 5 wt %, respectively based on the total amount of the second positive active material layer.

The binder improves binding properties of positive active material particles with one another and with a current collector. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, nylon, and/or the like, but are not limited thereto.

The conductive material is included to provide electrode conductivity. Any electrically conductive material may be utilized as a conductive material unless it causes a chemical change. Examples of the conductive material may include a carbon-based material such as natural graphite, artificial graphite, carbon black, acetylene black, ketjen black, a carbon fiber, and/or the like; a metal-based material of a metal powder or a metal fiber including copper, nickel, aluminum, silver, and/or the like; a conductive polymer such as a polyphenylene derivative; or a mixture thereof.

In one embodiment, when the electrode is the negative electrode, the positive electrode includes a positive active material layer formed on the current collector, and the types (kinds) and the amount of the positive active material, the binder and the conductive material may be as described above. For example, in the positive active material layer, the amount of the positive active material may be about 90 wt % to about 98 wt %, and the amounts of the binder and the conductive material may be about 1 wt % to about 5 wt %, respectively, based on the total amount of the positive active material layer. Also, the positive active material layer may be formed on one side or both (e.g., opposite) sides of the current collector.

The current collector may utilize Al (aluminum), but is not limited thereto.

Another embodiment provides a rechargeable lithium battery including the electrode according to one embodiment and a non-aqueous electrolyte. As described above, the electrode may be the negative electrode or the positive electrode, or may be the negative electrode. When the electrode is the negative electrode, the positive electrode is a general positive electrode including the positive active material layer formed on the current collector, as described above.

The electrode according to one embodiment may be prepared by coating a first active material layer composition including the first active material, the first binder, and optionally a conductive material on a current collector and drying to prepare a first active material layer; coating a second active material layer composition including a second active material, a second binder, and a fibrous ceramic material on the first active material layer and drying to prepare a second active material layer; and pressuring it.

In some embodiments, the first active material layer and the second active material layer may be concurrently (e.g., simultaneously) prepared.

A larger amount of the first binder included in the first active material layer composition than that of the second binder included in the second active material layer composition may enlarge an amount of the first binder included in the first active material layer compared to that of the binder included in the second active material layer. This allows a battery exhibiting both excellent or suitable adhesion strength and overvoltage to be provided.

The first active material layer composition and the second active material layer composition may include a solvent, for example, N-methylpyrrolidone and/or the like, but is not limited thereto. In some embodiments, when the aqueous binder is utilized in the active material layer, water may be utilized as a solvent.

Any method of preparing an active material layer is suitable in the art may be utilized, and a detailed description thereof will not be provided in the specification.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethyl acetate, methyl propionate, ethyl propionate, propyl propionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone, and/or the like. The alcohol-based solvent may include ethyl alcohol, isopropyl alcohol, and/or the like, and examples of the aprotic solvent may include nitriles such as R—CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and/or the like.

The organic solvent may be utilized alone or in a mixture. When the organic solvent is utilized in a mixture, the mixture ratio may be controlled or selected in accordance with a desirable battery performance and it may be well understood to one of ordinary skill in the related art.

The carbonate-based solvent may include a mixture of a cyclic carbonate and a linear carbonate. The cyclic carbonate and linear carbonate are mixed together in a volume ratio of about 1:1 to about 1:9. When the mixture is utilized as an electrolyte, it may have enhanced performance.

When the non-aqueous organic solvents are mixed and utilized, a mixed solvent of a cyclic carbonate and a linear carbonate, a mixed solvent of a cyclic carbonate and a propionate-based solvent, or a mixed solvent of a cyclic carbonate, a linear carbonate and a propionate-based solvent may be utilized. The propionate-based solvent may include methyl propionate, ethyl propionate, propyl propionate, or a combination thereof.

Herein, when a mixture of a cyclic carbonate and a linear carbonate, or a mixture of cyclic carbonate and a propionate-based solvent, is utilized, it may be desirable to utilize it with a volume ratio of about 1:1 to about 1:9 considering the performances. Furthermore, a cyclic carbonate, a linear carbonate, and a propionate-based solvent may be mixed and utilized at a volume ratio of about 1:1:1 to about 3:3:4. The mixing solvents may also be appropriately adjusted according to the desired or suitable properties.

The organic solvent may further include an aromatic hydrocarbon-based solvent as well as the carbonate-based solvent. Herein, the carbonate-based solvent and the aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

Chemical Formula 1

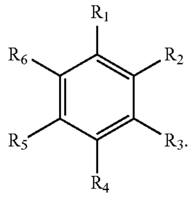

(In Chemical Formula 1, $R_1$ to $R_6$ may each independently be the same or different and are selected from hydrogen, a halogen, a C1 to C10 alkyl group, a haloalkyl group, and a combination thereof.)

Non-limiting (and more specific) examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 10 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or a combination thereof.

The electrolyte may further include vinylene carbonate, or an ethylene carbonate-based compound represented by Chemical Formula 2, as an additive for improving cycle life.

Chemical Formula 2

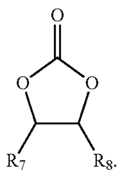

(In Chemical Formula 2, $R_7$ and $R_8$ may each independently be the same or different and may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not concurrently (e.g., not simultaneously) hydrogen.)

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. In case of further utilizing the additive for improving cycle life, an amount of the additive may be suitably controlled or selected within an appropriate or suitable range.

The electrolyte may further include vinyl ethylene carbonate, propane sultone, succinonitrile, or a combination thereof, and the amount thereof may be appropriately controlled or selected.

The lithium salt dissolved in an organic solvent supplies a battery with lithium ions, basically operates the rechargeable lithium battery, and improves transportation of the lithium ions between positive and negative electrodes. Examples of the lithium salt may include one or two selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiPO_2F_2$, LiN $C_xF_{2x+1}SO_2)(C_yF_{2y+1}SO_2)$, where x and y are a nautral numbers, for example, an integer of about 1 to about 20), lithium(difluoro(bisoxolato) phosphate), LiCl, LiI, $LiB(C_2O_4)_2$ (lithium bis(oxalato) borate: LiBOB), and lithium difluoro(oxalato)borate (LiDFOB), as a supporting electrolytic salt. A concentration of the lithium salt may range from about 0.1 M to about 2.0 M. When the lithium salt is included at the above concentration range, an electrolyte may have excellent or suitable performance and lithium ion mobility due to optimal or suitable electrolyte conductivity and viscosity.

A separator may be disposed between the positive electrode and the negative electrode depending on a type or kind of a rechargeable lithium battery. The separator may utilize polyethylene, polypropylene, polyvinylidene fluoride, or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and/or the like.

The drawing is an exploded perspective view of a rechargeable lithium battery according to an embodiment of the present disclosure. The rechargeable lithium battery according to an embodiment is illustrated as a prismatic battery but is not limited thereto, and may include variously-shaped batteries such as a cylindrical battery, a pouch battery, and/or the like.

Referring to the drawing, a rechargeable lithium battery 100 according to an embodiment may include an electrode assembly 40 manufactured by winding a separator 30 disposed between a positive electrode 10 and a negative electrode 20, and a case 50 housing the electrode assembly 40. An electrolyte may be impregnated in the positive electrode 10, the negative electrode 20 and the separator 30.

Hereinafter, examples and comparative examples of the present disclosure will be described. These examples, however, are not in any sense to be interpreted as limiting the scope of the present disclosure.

EXAMPLE 1

94 wt % of a graphite negative active material, 3 wt % of a denka black conductive material, 1 wt % of carboxymethyl cellulose, 2 wt % of a styrene-butadiene rubber binder were mixed in a water solvent to prepare a first negative active material layer slurry.

93.5 wt % of a graphite negative active material, 3 wt % of a denka black conductive material, 1 wt % of carboxymethyl cellulose, 0.5 wt % of a styrene-butadiene rubber binder, and 2 wt % of alumina ($Al_2O_3$) fiber (average diameter: 400 nm, average length: 2 μm) were mixed in a water solvent to prepare a second negative active material layer slurry.

The first negative active material layer slurry was coated on one side of a Cu foil current collector and dried to prepare a first negative active material layer, and the second negative active material layer slurry was coated on the first negative active material layer and dried to prepare a second negative active material layer, followed by pressurizing it to prepare a negative electrode.

Utilizing the negative electrode, a lithium counter electrode and an electrolyte, a half-cell was fabricated. As the electrolyte, 5 wt % of fluoroethylene carbonate added to 100 wt % of the electrolyte precursor 1.5 M $LiPF_6$, dissolved in ethylene carbonate, ethyl methyl carbonate, and dimethyl carbonate (30:50:20 volume ratio), was utilized.

EXAMPLE 2

94.4 wt % of a graphite negative active material, 3 wt % of a denka black conductive material, 1 wt % of carboxymethyl cellulose, 1.4 wt % of a styrene-butadiene rubber binder, and 0.2 wt % of alumina ($Al_2O_3$) fiber (average diameter: 4 nm, average length: 3 μm) were mixed in a water solvent to prepare a second negative active material layer slurry.

A negative electrode and a half-cell were fabricated by the same procedure as in Example 1, except for utilizing the second negative active material slurry.

EXAMPLE 3

93.5 wt % of a graphite negative active material, 3 wt % of a denka black conductive material, 1 wt % of carboxymethyl cellulose, 1.5 wt % of a styrene-butadiene rubber binder, and 1 wt % of alumina ($Al_2O_3$) fiber (average diameter: 4 nm, average length: 1.5 μm) were mixed in a water solvent to prepare a second negative active material layer slurry.

A negative electrode and a half-cell were fabricated by the same procedure as in Example 1, except for utilizing the second negative active material slurry.

EXAMPLE 4

93.5 wt % of a graphite negative active material, 3 wt % of a denka black conductive material, 1 wt % of carboxymethyl cellulose, 1.5 wt % of a styrene-butadiene rubber binder, and 1 wt % of alumina ($Al_2O_3$) fiber (average diameter: 1 nm, average length: 0.1 μm) were mixed in a water solvent to prepare a second negative active material layer slurry.

A negative electrode and a half-cell were fabricated by the same procedure as in Example 1, except for utilizing the second negative active material slurry.

EXAMPLE 5

92.5 wt % of a graphite negative active material, 3 wt % of a denka black conductive material, 1 wt % of carboxymethyl cellulose, 1.5 wt % of a styrene-butadiene rubber binder, and 2 wt % of alumina ($Al_2O_3$) fiber (average diameter: 200 nm, average length: 1 μm) were mixed in a water solvent to prepare a second negative active material layer slurry.

A negative electrode and a half-cell were fabricated by the same procedure as in Example 1, except for utilizing the second negative active material slurry.

EXAMPLE 6

90.15 wt % of a graphite negative active material, 3 wt % of a denka black conductive material, 1 wt % of carboxymethyl cellulose, 1.85 wt % of a styrene-butadiene rubber binder, and 4 wt % of alumina ($Al_2O_3$) fiber (average diameter: 1000 nm, average length: 10 μm) were mixed in a water solvent to prepare a second negative active material layer slurry.

A negative electrode and a half-cell were fabricated by the same procedure as in Example 1, except for utilizing the second negative active material slurry.

COMPARATIVE EXAMPLE 1

95.0 wt % of a graphite negative active material, 3 wt % of a denka black conductive material, 1 wt % of carboxymethyl cellulose, and 1 wt % of a styrene-butadiene rubber binder were mixed in a water solvent to prepare a second negative active material layer slurry.

A negative electrode and a half-cell were fabricated by the same procedure as in Example 1, except for utilizing the second negative active material slurry.

EXAMPLE 7

93.0 wt % of a graphite negative active material, 3 wt % of a denka black conductive material, 1 wt % of carboxymethyl cellulose, 1.85 wt % of a styrene-butadiene rubber binder, and 2 wt % of silica ($SiO_2$) fiber (average diameter: 200 nm, average length: 1 μm) were mixed in a water solvent to prepare a second negative active material layer slurry.

A negative electrode and a half-cell were fabricated by the same procedure as in Example 1, except for utilizing the second negative active material slurry.

EXAMPLE 8

93.0 wt % of a graphite negative active material, 3 wt % of a denka black conductive material, 1 wt % of carboxymethyl cellulose, 1 wt % of a styrene-butadiene rubber binder, and 2 wt % of titania ($TiO_2$) fiber (average diameter: 200 nm, average length: 1 μm) were mixed in a water solvent to prepare a second negative active material layer slurry.

A negative electrode and a half-cell were fabricated by the same procedure as in Example 1, except for utilizing the second negative active material slurry.

EXAMPLE 9

93.0 wt % of a graphite negative active material, 3 wt % of a denka black conductive material, 1 wt % of carboxymethyl cellulose, 1 wt % of a styrene-butadiene rubber binder, and 2 wt % of $Zr_2O_3$ (tetragonal partially stabilized zirconia (PSZ) fiber (average diameter: 200 nm, average length: 1 μm) were mixed in a water solvent to prepare a second negative active material layer slurry.

A negative electrode and a half-cell were fabricated by the same procedure as in Example 1, except for utilizing the second negative active material slurry.

COMPARATIVE EXAMPLE 2

93.0 wt % of a graphite negative active material, 3 wt % of a denka black conductive material, 1 wt % of carboxymethyl cellulose, 1 wt % of a styrene-butadiene rubber binder, and 2 wt % of carbon nanotubes (average diameter: 20 nm, average length: 1000 μm) were mixed in a water solvent to prepare a second negative active material layer slurry.

A negative electrode and a half-cell were fabricated by the same procedure as in Example 1, except for utilizing the second negative active material slurry.

COMPARATIVE EXAMPLE 3

93.0 wt % of a graphite negative active material, 3 wt % of a denka black conductive material, 1 wt % of carboxymethyl cellulose, 1 wt % of a styrene-butadiene rubber binder, and 2 wt % of alumina ($Al_2O_3$) particles (average diameter: 2 μm) were mixed in a water solvent to prepare a second negative active material layer slurry.

A negative electrode and a half-cell were fabricated by the same procedure as in Example 1, except for utilizing the second negative active material slurry.

COMPARATIVE EXAMPLE 4

94.0 wt % of a graphite negative active material, 3 wt % of a denka black conductive material, 1 wt % of carboxymethyl cellulose, 1 wt % of a styrene-butadiene rubber binder, and 1 wt % of alumina ($Al_2O_3$) fiber (average diameter: 200 nm, average length: 1 μm) were mixed in a water solvent to prepare a first negative active material layer slurry.

94.0 wt % of a graphite negative active material, 3 wt % of a denka black conductive material, 1 wt % of carboxymethyl cellulose, and 2 wt % of a styrene-butadiene rubber binder were mixed in a water solvent to prepare a second negative active material layer slurry.

A negative electrode and a half-cell were fabricated by the same procedure as in Example 1, except for utilizing the first negative active material and the second negative active material slurry.

COMPARATIVE EXAMPLE 5

94.0 wt % of a graphite negative active material, 3 wt % of a denka black conductive material, 1 wt % of carboxymethyl cellulose, 2.5 wt % of a styrene-butadiene rubber binder, and 0.5 wt % of alumina ($Al_2O_3$) fiber (average diameter: 200 nm, average length: 1 μm) were mixed in a water solvent to prepare a first negative active material layer slurry.

94.0 wt % of a graphite negative active material, 3 wt % of a denka black conductive material, 1 wt % of carboxymethyl cellulose, 2 wt % of a styrene-butadiene rubber binder, and 1 wt % of alumina ($Al_2O_3$) fiber (average diameter: 200 nm, average length: 1 μm) were mixed in a water solvent to prepare a second negative active material layer slurry.

A negative electrode and a half-cell were fabricated by the same procedure as in Example 1, except for utilizing the first negative active material and the second negative active material slurry.

COMPARATIVE EXAMPLE 6

94.0 wt % of a graphite negative active material, 3 wt % of a denka black conductive material, 1 wt % of carboxymethyl cellulose, and 2 wt % of a styrene-butadiene rubber binder were mixed in a water solvent to prepare a first negative active material layer slurry.

93.5 wt % of a graphite negative active material, 3 wt % of a denka black conductive material, 1 wt % of carboxymethyl cellulose, 2.2 wt % of a styrene-butadiene rubber binder, and 4 wt % of alumina ($Al_2O_3$) fiber (average diameter: 200 nm, average length: 1 μm) were mixed in a water solvent to prepare a second negative active material layer slurry.

A negative electrode and a half-cell were fabricated by the same procedure as in Example 1, except for utilizing the first negative active material and the second negative active material slurry.

COMPARATIVE EXAMPLE 7

94.0 wt % of a graphite negative active material, 3 wt % of a denka black conductive material, 1 wt % of carboxymethyl cellulose, and 2 wt % of a styrene-butadiene rubber binder were mixed in a water solvent to prepare a first negative active material layer slurry.

93 wt % of a graphite negative active material, 3 wt % of a denka black conductive material, 1 wt % of carboxymethyl cellulose, 2 wt % of a styrene-butadiene rubber binder, and 1 wt % of alumina ($Al_2O_3$) fiber (average diameter: 200 nm, average length: 1 μm) were mixed in a water solvent to prepare a second negative active material layer slurry.

A negative electrode and a half-cell were fabricated by the same procedure as in Example 1, except for utilizing the first negative active material and the second negative active material slurry.

EXPERIMENTAL EXAMPLE 1) EVALUATION OF ADHERENCE

Adherences for the negative electrode of Examples 1 to 9 and Comparative Examples 1 to 7 were measured. The adherence experiment was performed by utilizing an universal tester, and fixing the negative active material layer formed on the Cu current collector, to a polyvinylchloride (PVC) double-sided adhesive tape, and detaching the negative electrode at a 180° peel and at a speed of 50 mm/mined to measure adherence strength. The results are shown in Table 1.

EXPERIMENTAL EXAMPLE 2) EVALUATION OF FAST CHARGEABILITY CHARACTERISTIC

The half-cells of Examples 1 to 9 and Comparative Examples 1 to 7 were charged and discharged at 0.2 C once and then charged and discharged at 3 C once. The ratio of charge capacity at 2 C to charge capacity at 0.2 C were measured. The results are shown in Table 1.

The ratio of the binder included in the second negative active material layer to the total binder included in the first negative active material layer and the second negative active material layer was measured. The results are shown in Table 1. The values of the second negative active material layer binder/(amount of the first negative active material layer binder and the amount of the second negative active material layer binder) are shown in Table 1.

TABLE 1

| | Ratio of amount of binder in second negative active material layer/(amount of binder in first negative active material layer and amount of binder in second negative active material layer) (%) | Negative electrode adherence (gf/cm) | Chargeability (%) |
|---|---|---|---|
| Example 1 | 20 (0.5/2.5) | 2.1 | 92.8 |
| Example 2 | 41 (1.4/3.4) | 1.6 | 94.6 |
| Example 3 | 43 (1.5/3.5) | 1.4 | 95.4 |
| Example 4 | 43 (1.5/3.5) | 1.4 | 95.1 |
| Example 5 | 43 (1.5/3.5) | 1.2 | 90.7 |
| Example 6 | 48 (1.85/3.85) | 1 | 89.2 |
| Comparative Example 1 | 33 1/3 | 2.7 | 85.2 |
| Example 7 | 33 1/3 | 1.8 | 87.8 |
| Example 8 | 33 1/3 | 1.9 | 90.4 |
| Example 9 | 33 1/3 | 1.8 | 90.2 |
| Comparative Example 2 | 33 1/3 | 2.2 | 85.4 |
| Comparative Example 3 | 33 1/3 | 2.5 | 85.3 |
| Comparative Example 4 | 67 2/3 | 0.3 | 82.4 |
| Comparative Example 5 | 29 (1/3.5) | 0.6 | 84.1 |
| Comparative Example 6 | 52 (2.2/4.2) | 1.2 | 85.1 |
| Comparative Example 7 | 67 2/3 | 1 | 84.5 |

As shown in Table 1, Examples 1 to 9 in which the amount of the binder included in the first active material layer was higher than the amount of the binder included in the second active material layer, and the second active material layer included the fibrous ceramic material, exhibited high adherence and an excellent or suitable high-rate charge characteristic.

On the other hand, Comparative Example 1 in which the second active material layer included no fibrous ceramic material exhibited good or suitable adherence, but had a significantly deteriorated high-rate charge characteristic.

Comparative Example 2 utilizing carbon nanotubes, although the fibrous material was utilized, and Comparative Example 3 utilizing particle-shaped alumina, exhibited a surprisingly deteriorated high-rate charge characteristic.

When the fibrous ceramic material was utilized in the first negative active material layer (Comparative Example 4), or when it was utilized in both (e.g., simultaneously) first and second negative active material layers (Comparative Example 5), the adherence and high-rate charge characteristics were significantly deteriorated.

Furthermore, even when the second active material layer included the fibrous ceramic material, Comparative Examples 6 and 7 in which the amount of the binder included in the first active material layer was smaller than that of the binder included in the second active material layer, exhibited a deteriorated high-rate charge characteristic.

While this present disclosure has been described in connection with what is presently considered to be practical example embodiments, it is to be understood that the present disclosure is not limited to the disclosed embodiments. In contrast, it is intended to cover one or more suitable modifications and equivalent arrangements included within the spirit and scope of the appended claims. Therefore, the aforementioned embodiments should be understood to be examples but not to be limiting of the present disclosure in any way.

While this present disclosure has been described in connection with what is presently considered to be practical example embodiments, it is to be understood that the present disclosure is not limited to the disclosed embodiments. In contrast, it is intended to cover one or more suitable modifications and equivalent arrangements included within the spirit and scope of the appended claims, and equivalents thereof.

As used herein, the term “substantially,” “about,” and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

Also, any numerical range recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms “use,” “using,” and “used” may be considered synonymous with the terms “utilize,” “utilizing,” and “utilized,” respectively.

The use of “may” when describing embodiments of the present disclosure refers to “one or more embodiments of the present disclosure.”

As used herein, the singular forms “a”, “an” and “the” are intended to include the plural forms as well, unless the context clearly indicates otherwise.

In the present disclosure, when particles are spherical, “size” or “diameter” indicates a particle diameter or an average particle diameter, and when the particles are non-spherical, the “size” or “diameter” indicates a major axis length or an average major axis length. That is, when particles are spherical, “diameter” indicates a particle diameter, and when the particles are non-spherical, the “diameter” indicates a major axis length. The size or diameter of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

As used herein, expressions such as “at least one of”, “one of”, and “selected from”, when preceding a list of elements, modify the entire list of elements and do not modify the individual elements of the list. For example, “at least one of a, b or c”, “at least one selected from a, b and c”, etc., may indicate only a, only b, only c, both (e.g., simultaneously) a and b, both (e.g., simultaneously) a and c, both (e.g., simultaneously) b and c, all of a, b, and c, or variations thereof.

The vehicle, a battery management system (BMS) device, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the present disclosure.

What is claimed is:

1. An electrode for a rechargeable lithium battery, the electrode comprising:

a current collector;

a first active material layer on the current collector, and comprising a first active material and a first binder; and a second active material layer on the first active material layer, and comprising a second active material and a second binder, wherein an amount of the first binder comprised in the first active material layer is higher than an amount of the second binder comprised in the second active material layer, and only the second active material layer comprises a fibrous ceramic material.

2. The electrode for the rechargeable lithium battery of claim 1, wherein the fibrous ceramic material comprises cellulose, alumina ($Al_2O_3$), silica ($SiO_2$), titania ($TiO_2$), magnesia (MgO), $ZrO_2$, $Zr_2O_3$ or a combination thereof.

3. The electrode for the rechargeable lithium battery of claim 1, wherein the fibrous ceramic material has an average diameter of about 1 nm to about 1000 nm.

4. The electrode for the rechargeable lithium battery of claim 1, wherein an amount of the fibrous ceramic material is about 0.2 wt % to about 4.0 wt % based on a total of 100 wt %, of the second active material layer.

5. The electrode for the rechargeable lithium battery of claim 1, wherein a weight ratio of the first binder and the second binder is about 51:49 to about 80:20.

6. The electrode for the rechargeable lithium battery of claim 1, wherein the first active material and the second active material comprise a silicon-based negative active material, a carbon-based negative active material or a combination thereof.

7. A rechargeable lithium battery, comprising:

an electrode of claim 1; and a non-aqueous electrolyte.

8. The rechargeable lithium battery of claim 7, wherein the electrode is a negative electrode.

* * * * *